United States Patent [19]

Morimoto

[11] Patent Number: 4,680,987
[45] Date of Patent: Jul. 21, 1987

[54] CONTROL SYSTEM FOR AN INFINITELY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 796,475

[22] Filed: Nov. 8, 1985

[30] Foreign Application Priority Data

Nov. 16, 1984 [JP] Japan ................... 59-241957

[51] Int. Cl.⁴ .............................................. B60K 41/16
[52] U.S. Cl. ....................................... 74/866; 74/864; 192/0.073; 192/21.5
[58] Field of Search ................. 74/866, 864, 865; 474/11, 12, 18, 28, 70; 364/424.1; 192/0.048, 0.092, 0.073, 21.5

[56] References Cited

U.S. PATENT DOCUMENTS

| | | | |
|---|---|---|---|
| 4,343,387 | 8/1982 | Hofbauer | 192/0.092 X |
| 4,387,668 | 6/1983 | Mohl et al. | 74/866 |
| 4,458,318 | 7/1984 | Smit et al. | 474/18 X |
| 4,458,560 | 7/1984 | Frank et al. | 74/866 X |
| 4,466,521 | 8/1984 | Hattori et al. | 74/866 |
| 4,470,117 | 9/1984 | Miki et al. | 74/866 X |
| 4,509,125 | 4/1985 | Fattic et al. | 474/18 X |
| 4,515,040 | 5/1985 | Takeuchi et al. | 74/866 |
| 4,515,041 | 5/1985 | Frank et al. | 74/865 |
| 4,518,068 | 5/1985 | Oguma et al. | 192/0.092 X |
| 4,542,665 | 9/1985 | Yamamuro et al. | 192/0.092 X |
| 4,546,673 | 10/1985 | Shigematsu et al. | 74/866 |
| 4,584,907 | 4/1986 | Niwa et al. | 74/866 |

Primary Examiner—Leslie Braun
Assistant Examiner—Dwight G. Diehl
Attorney, Agent, or Firm—Martin A. Farber

[57] ABSTRACT

A system is provided with an electromagnetic clutch for transmitting the output of an engine to a transmission. During deceleration of a vehicle by closing a throttle valve to an idling position, when the clutch is disengaged at a low vehicle speed, a transmission ratio control valve is operated to upshift the transmission, whereby the speed of a drive pulley of the transmission is decreased to the engine idling speed.

10 Claims, 8 Drawing Figures

CONTROL SYSTEM FOR AN INFINITELY VARIABLE TRANSMISSION

BACKGROUND OF THE INVENTION

The present invention relates to a hydraulic pressure control system for an infinitely variable belt-drive automatic transmission for a vehicle.

A known control system for an infinitely variable belt-drive transmission comprises an endless belt running over a drive pulley and a driven pulley. Each pulley comprises a movable conical disc which is axially moved by a fluid operated servo device so as to vary the running diameter of the belt on the pulley in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of the engine is transmitted to the drive pulley through a clutch such as an electromagnetic clutch. The line pressure is controlled to prevent the belt from slipping on the pulleys in order to transmit the output of the engine.

Figure 7:
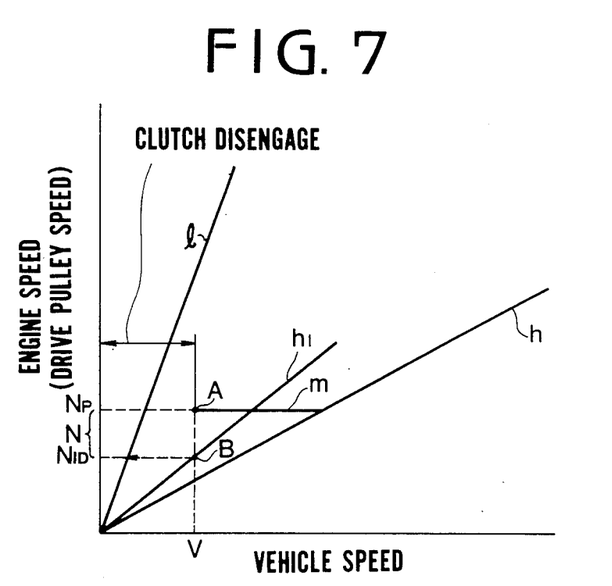
FIG. 7 is a graph showing the relationship between vehicle speed and engine speed.

FIG. 7 shows the relationship between the speed of a vehicle provided with the transmission and engine speed. In the graph, a line l is a maximum transmission ratio line and a line h is a minimum transmission ratio line. When an accelerator pedal of the vehicle is released to close the throttle valve of the engine to its idling position, the vehicle speed decreases along a transmission ratio increasing (downshifting) line m. When the vehicle speed decreases below a predetermined low speed (18 Km/h), e.g. v, the electromagnetic clutch is automatically disengaged so as to prevent stalling of the engine. During driving along the line m before disengagement of the clutch, the drive pulley and the engine are driven by the torque transmitted from the wheels of the vehicle through the driven pulley and the belt at a speed $N_P$ which is higher than the idling speed $N_{ID}$ of the engine. However, when the clutch is disengaged, the engine speed drops to the idling speed $N_{ID}$. The speed $N_P$ is, for example 1500 rpm and the idling speed is 800 rpm. Therefore, there is a considerable speed difference N.

Under this condition, when the accelerator pedal is depressed in order to accelerate the vehicle and the engine speed slightly increases, the clutch is automatically engaged. However, since the difference between the engine speed and the drive pulley speed is large, a great shock occurs upon engagement of the clutch. Further, since the transmission ratio is large at that time, there is a large engine braking operation effect on the vehicle, which produces uncomfortable shock.

SUMMARY OF THE INVENTION

The object of the present invention is to provide a system which may smoothly engage the clutch, whereby the above-described problems can be resolved.

To this end, in the system according to the present invention, the speed of the drive pulley is controlled to a speed approximately the speed of an engine.

According to the present invention, there is provided a system for controlling an infinitely variable transmission for transmitting the power of an internal combustion engine through a clutch, comprising a drive pulley having a hydraulically shiftable disc and a hydraulic cylinder for shifting the disc, a driven pulley having a hydraulically shiftable disc and a hydraulic cylinder for operating the disc, a belt engaged with both pulleys, and a pressure oil circuit having a pump for supplying pressurized oil, a transmission ratio control valve having a spool for controlling the pressurized oil so as to move the disc of the drive pulley to change the transmission ratio. The system comprises first means for moving the spool of the transmission ratio control valve. The system comprises second means for detecting the disengagement of the clutch below a low vehicle speed for producing a coasting signal, third means responsive to the coasting speed, for producing a drive pulley speed set signals, and fourth means responsive to the set signal for shifting the spool of the transmission ratio control valve in the upshifting direction thereby decreasing the drive pulley speed.

The other objects and features of this invention will become understood from the following description with reference to the accompanying drawings.

DETAILED DESCRIPTION OF THE PREFERRED EMBODIMENT

Figure 1:
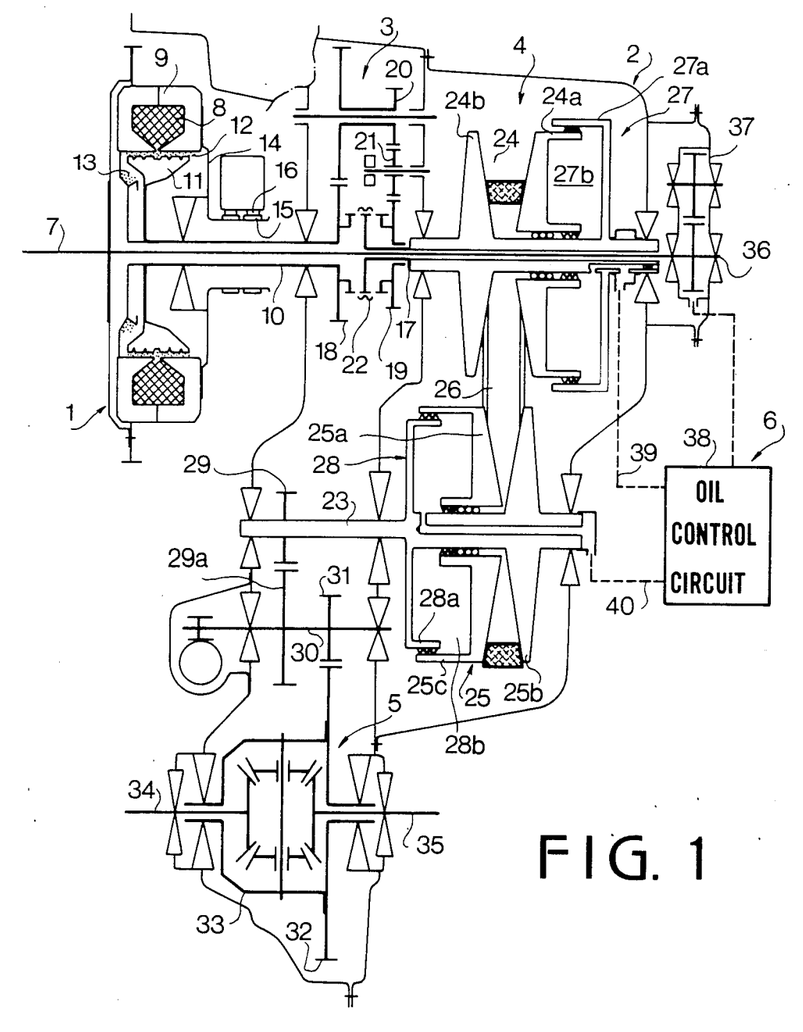
FIG. 1 is a schematic illustration of an infinitely variable belt-drive transmission.

Referring to FIG. 1, the infinitely variable belt-drive automatic transmission for a motor vehicle to which the present invention is applied, comprises an electromagnetic powder clutch 1, an infinitely variable belt-drive transmission 2, a selector mechanism 3, pulleys and belt device 4, final reduction device 5, and an oil control circuit 6. A crankshaft 7 of an engine (not shown) is connected to an annular drive member 9 of the electromagnetic powder clutch 1. The electromagnetic powder clutch comprises a magnetizing coil 8 provided in the drive member 9, a driven member 11 having its outer periphery spaced from the inner periphery of the drive member 9 by a gap 12, and a powder chamber 13 defined between the drive member 9 and driven member 11. In the powder chamber 13, magnetic powder is provided. The driven member 11 is secured to an input shaft 10 of the belt-drive transmission. A holder 14 secured to the drive member 9 carries slip rings 15 which are electrically connected to the coil 8. The coil 8 is supplied through brushes 16 and the slip rings 15 with clutch current from a electronic control circuit (not shown).

When the magnetizing coil 8 is excited by clutch current, the drive member 9 is magnetized to produce a magnetic flux passing through the driven member 11.

The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially to the input shaft 10. The selector device 3 comprises a drive gear 18 integral with the input shaft 10, a reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged with the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 10. When the synchronizer 22 is engaged with the gear 18, the input shaft 10 is connected to the main shaft 17 through the synchronizer 22 to provide a driving position (D range).

When the synchronizer 22 is engaged with the gear 19, the input shaft 10 is connected to the main shaft 17 through gears 18, 20, 21 and 19 to provide a reverse driving position (R range).

The main shaft 17 has an axial passage in which an oil pump driving shaft 36 connected to crankshaft 7 is mounted. An output shaft 23 is provided in parallel with the main shaft 17. A drive pulley (primary pulley) 24 and a driven pulley (secondary pulley) 25 are mounted on shafts 17 and 23 respectively. A fixed conical disc 24b of the drive pulley 24 is integral with the main shaft 17 and an axially movable conical disc 24a is axially slidably mounted on the main shaft 17. The movable conical disc 24a also slides in a cylinder 27a formed on the main shaft 17 to provide a servo device 27. A chamber 27b of the servo device 27 communicates with the oil pump 37 through a passage 39 and an oil control circuit 38. The oil pump 37 is a gear pump driven by the shaft 36.

A fixed conical disc 25b of the driven pulley 25 is formed on the output shaft 23 opposite the movable conical disc 24a and an axially movable conical disc 25a is slidably mounted on the shaft 23 opposite disc 24b. The movable conical disc 25a has a cylindrical portion 25c in which a piston portion 28a of the output shaft 23 is slidably engaged to form a servo device 28. A chamber 28b of the servo device 28 is communicated with the oil pump 37 through a passage 40 and the control circuit 38. A drive belt 26 engages with the drive pulley 24 and the driven pulley 25.

Secured to the output shaft 23 is a drive gear 29 which engages with an intermediate reduction gear 29a on an intermediate shaft 30. An intermediate gear 31 on the shaft 30 engages with a final gear 32. The rotation of the final gear 32 is transmitted to axles 34 and 35 of the vehicle driving wheels (not shown) through a differential 33.

Figure 2:
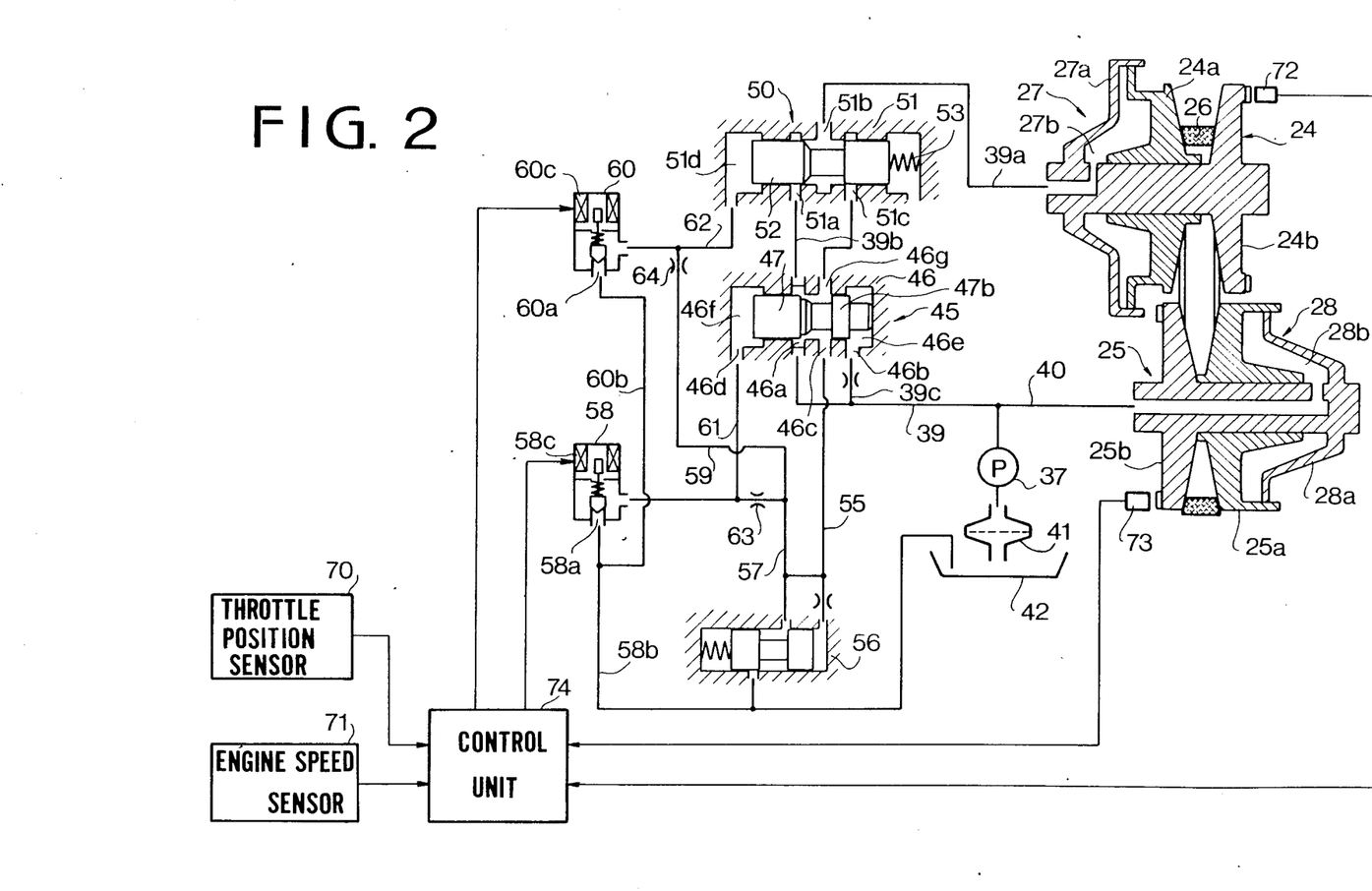
FIG. 2 is a schematic diagram showing a control system according to the present invention.

Referring to FIG. 2, the chamber 27b of the servo device 27 is applied with pressurized oil by the oil pump 37 from an oil reservoir 42 passing through a filter 41, a conduit 39, a line pressure control valve 45 and a transmission ratio control valve 50. The chamber 28b of servo device 28 is applied with pressurized oil at a secondary pressure through passage 40 without passing through the valves 45 and 50. The movable conical disc 24a of the drive pulley 24 is so designed that the pressure receiving area thereof is larger than that of the movable conical disc 25a of the driven pulley 25. The line pressure control valve 45 comprises a valve body 46, a spool 47, and end chambers 46e and 46f. A land 47b of the spool 47 is applied with pressure of the pressurized oil in the chamber 46e supplied through a conduit 39c and a port 46b. The other end of the spool 47 is applied with the pressure of the oil in the chamber 46f supplied from a port 46d. An annular groove 46a connected with conduit 39 is communicated with a conduit 39b and communicated with a port 46c in accordance with the position of the left-hand land of the spool 47.

The transmission ratio control valve 50 comprises a valve body 51, a spool 52, and a spring 53 for urging the spool in the upshift direction. A port 51b of the valve body 51 is selectively communicated with a pressure oil supply port 51a or a drain port 51c in accordance with the position of lands of the spool. The port 51b communicates with the chamber 27b through a conduit 39a, and the port 51a communicates with the line pressure control valve 45 through the conduit 39b. The drain port 51c communicates with ports 46g and 46c of the line pressure control valve 45. An end chamber 51d of the transmission ratio control valve 50 is applied with control pressure through a line 62.

Thus, the spool 52 is shifted in dependence on the control pressure and on the spring 53 to change the transmission ratio of the pulley-belt transmission.

The drain port 46c communicates with oil reservoir 42 through a conduit 55 and a pressure regulator valve 56 which operates to keep the pressure of oil in the conduit 55 constant. The pressure in conduit 55 is applied to the chambers 46f and 51d of line pressure control value 45 and the transmission ratio control valve 50 through conduits 57, 61, 59 and 62, respectively. The oil pressure applied to the chamber 46f is also applied to a solenoid operated valve 58, and the pressure applied to the chamber 51d is applied to a solenoid operated valve 60. Drain ports 58a and 60a of both valves 58 and 60 are communicated with the oil reservoir 42 through conduits 58b and 60b. The valves 58, 60 are opened by exciting solenoids (coils) 58c and 60c, respectively. Thus, the pressure applied to each chamber is controlled by controlling the excitation of each solenoid. Orifices 63 and 64 are provided so as to prevent fluctuation of pressure applied to each chamber, which is caused by the operation of the solenoid operated valves.

A throttle position sensor 70, an engine speed sensor 71, drive and driven pulley speed sensors 72 and 73 are provided for producing respective signals which are supplied to a control unit 74. The control unit 74 produces control signals for operating the solenoid operated valves 58 and 60 as described hereinafter.

Figure 4:
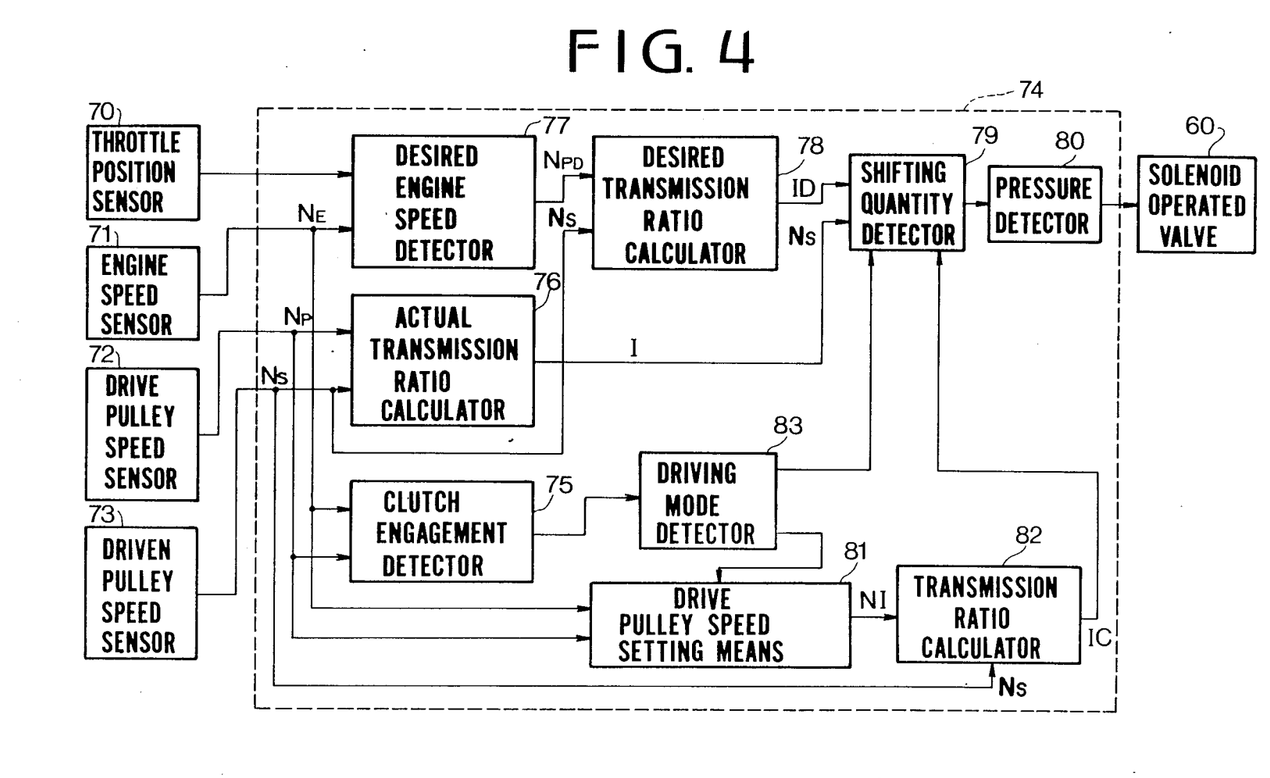
FIG. 4 is a block diagram showing a control unit.

Explaining a transmission ratio control system with reference to FIG. 4, an engine speed signal $N_E$ from engine speed sensor 71 and a drive pulley speed signal $N_P$ from drive pulley speed sensor 72 are fed to a clutch engagement detector 75 which produces a clutch engagement signal when the signal $N_E$ coincides with signal $N_P$. The clutch engagement signal is applied to a driving mode detector 83. The detector 83 produces a driving signal upon occurrence of the clutch engagement signal and produces a coasting signal when the clutch disengages (disappearance of the clutch engagement signal) at low vehicle speed below a predetermined vehicle speed V (FIG. 7) respectively. Signal $N_P$ and a driven pulley speed signal $N_S$ from driven pulley speed sensor 73 are supplied to an actual transmission ratio calculator 76 which calculates the actual transmission ratio $I(N_P/N_S)$. A desired engine speed detector 77 is applied with a throttle position signal from throttle position sensor 70 and the engine speed signal $N_E$. A table is provided storing desired engine speed in accordance with throttle position and engine speed. The desired engine speed detector 77 produces the desired engine speed signal $N_{PD}$ from the table.

Figure 5A:
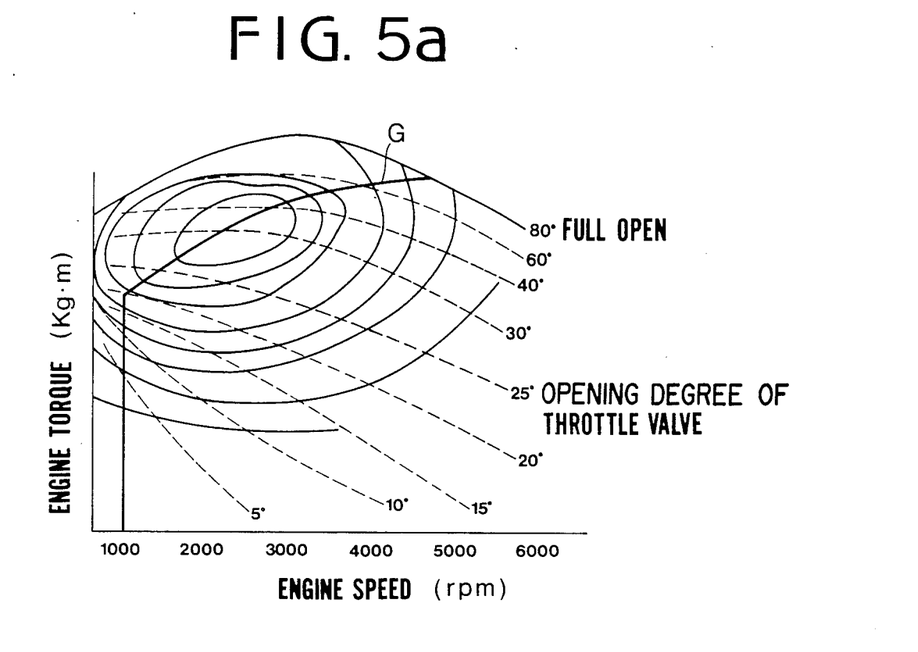
FIGS. 5a and 5b show minimum fuel consumption lines.

FIG. 5a shows an engine output torque graph indicating specific fuel comsumption by solid lines and also opening degree of the throttle valve by dotted lines.

Figure 5B:
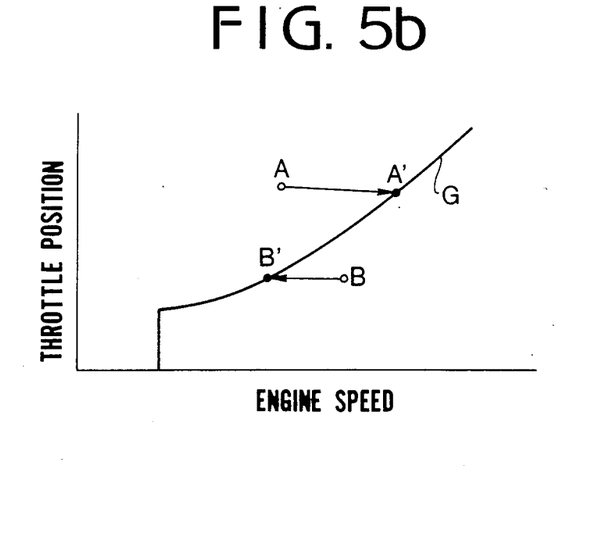

FIG. 5a shows a minimum fuel consumption line G based on engine speed and engine torque. The line G can be represented in accordance with engine speed and throttle position as shown in FIG. 5b. The table for the desired engine speed is prepared from the graph of FIG. 5b.

A desired transmission ratio calculator 78 is applied with the desired engine speed signal $N_{PD}$ and the driven pulley speed signal $N_S$ to produce a desired transmission ratio $I_D$ ($N_{PD}/N_S$).

Output signals I and $I_D$ of the actual transmission ratio calculator 76 and desired transmission ratio calculator 78 are fed to a shifting quantity dectector 79. In response to the driving signal from the driving mode detector 83, the shifting quantity detector an output signal representing the quantity for upshifting or downshifting. On the other hand, a drive pulley speed setting means 81 is applied with the engine speed signal $N_E$, the drive pulley speed signal $N_P$ and the coasting output signal of the driving mode detector 83 to produce a set speed signal $N_I$. A transmission ratio calculator 82 is applied with the set speed signal $N_I$ and the driven pulley speed signal $N_S$ to produce a transmission ratio signal $I_C$. The transmission ratio signal $I_C$ and the driving output signal of the driving mode detector 83 are respectively sent to the shifting quantity detector 79. The output signal of the shifting quantity detector 79 is applied to a pressure determining means 80 (pressure detector) which produces an output signal for determining the control pressure for the transmission ratio via operative of the solenoid-operated valve 60. The output signal of the detector 80 comprises pulses, the duty ratio of which is determined by the output signal, which are applied to the solenoid operated valve 60.

On the other hand, the line pressure is controlled by operating the solenoid operated valve 58 dependent on the engine speed and engine torque.

In operation, the solenoid operated valves 58 and 60 are operated by signals from the control unit 74 at respective duty ratios. By the operation of the valve 58, the amount of drain oil is controlled to produce a control pressure which is applied to the chamber 46f of the line pressure control valve 45 through line 61. On the other hand, the control pressure determined by the valve 60 is applied to the chamber 51d of the transmission ratio control valve 50 through line 62. The transmission ratio control valve 50 is operated by the control pressure to apply the line pressure to the chamber 27b of the servo device 27 or to drain the chamber, so that the transmission ratio is controlled.

Figure 3:
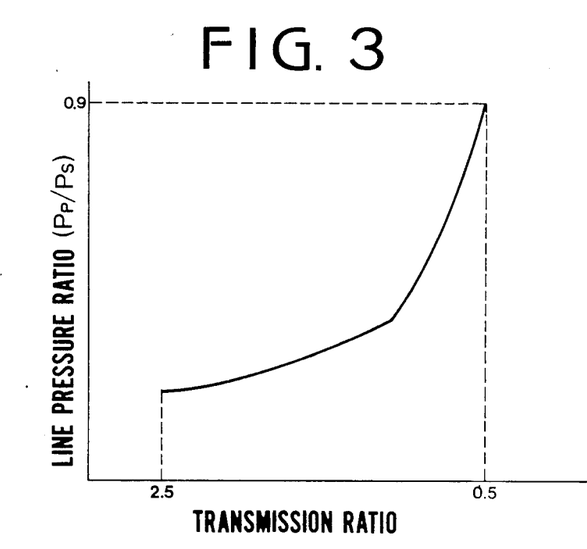
FIG. 3 is a graph showing the relationship between transmission ratio and line pressure ratio.

FIG. 3 shows the relationship between the transmission ratio and the ratio of the line pressure ($P_P$) applied to the drive pulley 24 to the line pressure ($P_S$) applied to the driven pulley 25. From the graph of FIG. 3, it will be seen that the transmission ratio can be controlled by controlling the line pressure $P_p$ for the drive pulley.

Figure 6:
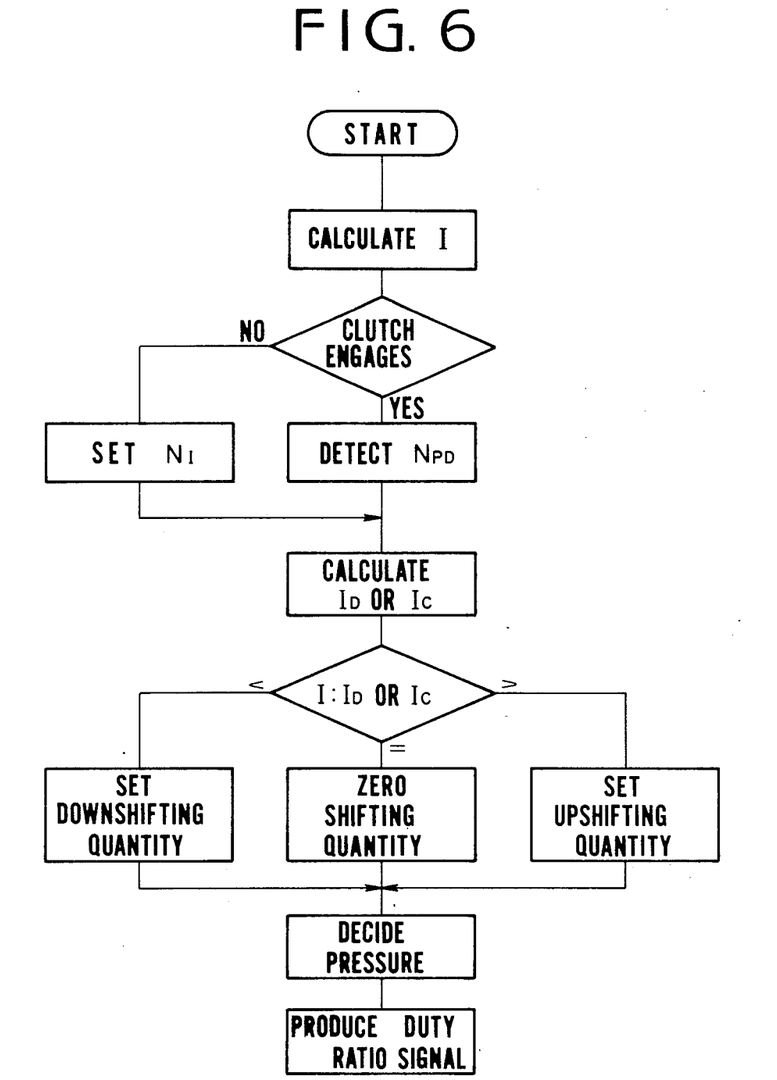
FIG. 6 is a flowchart showing the operation of the system.

Explaining the control operation with reference to FIG. 6, the shifting quantity detector 79 produces a signal dependent on the desired transmission ratio signal $I_D$, the actual transmission ratio signal I, and the output signals of the units 83 and 82. The output signal of the detector 79 represents the shifting quantity of the spool 52 of the valve 50.

Referring to FIG. 5b, the fact that an actual engine speed A is lower than a desired engine speed A' on the minimum fuel consumption line G means that actual transmission ratio I is lower than desired transmission ratio $I_D$. Accordingly the transmission must be downshifted. The detector 79 produces an output signal corresponding to the quantity (amount) of the downshifting. Namely, the duty ratio of the output pulses applied to the solenoid operated valve 60 is reduced so as to increase the control pressure applied to the chamber 51d. Accordingly, the spool 52 is moved to the right (downshift direction) to drain the chamber 27b. Thus, the movable disc 24a is moved to the left to increase the transmission ratio, whereby the engine speed is increased in order to maintain the vehicle speed constant. To the contrary, when an actual engine speed B is higher than a desired engine speed B', the duty ratio of the output pulses is increased so as to move the spool to the left. Accordingly, the line pressure is applied to the chamber 27b to upshift the transmission. Thus, engine speed is reduced.

Referring to FIG. 7, when the clutch 1 disengages at a predetermined low vehicle speed V while the transmission ratio is being downshifted along the line m at the throttle valve released condition, i.e. the minimum opening degree of the throttle valve (idling position), the driving mode detector 83 produces a coasting signal and the engine speed decreases to the idling speed and the drive pulley 24 is driven by the wheels of the vehicle via the driven pulley 25 and the belt at a higher speed than the engine speed. The coasting signal is applied to the drive pulley speed setting means 81 which produces set speed signal $N_I$ representing the idling speed of the engine. The set speed signal $N_I$ is fed to the transmission ratio calculator 82 which produces the transmission ratio signal $I_C$. The signal $I_C$ means that the transmission ratio is to be decreased so as to reduce the drive pulley speed to the idling speed. The transmission ratio signal $I_C$ is supplied to the shifting quantity detector 79 in addition the actual transmission ratio I whereby the shifting quantity is determined therefrom. Thus, the transmission is upshifted to reduce the drive pulley speed to the idling speed $N_{ID}$. Thus, the drive pulley speed at point A on the line m decreases to a speed at point B on a lower transmission ratio line $h_1$. Thereafter, the transmission is progressively downshifted so as to maintain the drive pulley speed at the idling speed.

Under such a condition, when the accelerator pedal is depressed to slightly increase the engine speed, the clutch is engaged. At that time, since the difference between the engine speed and the drive pulley speed is small, the clutch can be smoothly engaged. In addition, since the engine speed is slightly higher than the drive pulley speed, engine braking does not have a great effect upon engagement of the clutch.

Referring to the flowchart of FIG. 6, after starting in the first step "START", the next step "CALCULATE I" calculates the actual transmission ratio I. In the next step "CLUTCH ENGAGES", when the clutch 1 engages, "YES", the next step detects the desired pulley speed $N_{PD}$. If the clutch 1 does not engage, "NO", then the program sets the drive pulley set speed $N_I$. In the next step "CALCULATE $I_D$ or $I_C$" the desired transmission ratio $I_D$ or the calculated transmission ratio $I_C$ based on the set speed $N_I$ is calculated depending upon which condition of engagement of the clutch has occurred. In the next step the actual transmission ratio I is compared to the desired transmission ratio $I_D$ or to the calculated transmission ratio $I_C$, and depending upon if it is greater, equal to or less, then the quantity for shifting is respectively set for upshifting, zero shifting or downshifting. In response to the shifting quantity the pressure is decided in the next step and in response to the decided pressure the final step produces the duty ratio signal.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a system for controlling an infinitely variable transmission for transmitting the power of an internal combustion engine through a clutch for driving a motor vehicle, the transmission comprising a drive pulley having a hydraulically shiftable disc and a hydraulic cylinder for shifting the disc, a driven pulley having a hydraulically shiftable disc and a hydraulic cylinder for operating the disc of the driven pulley, and a belt engaged with both pulleys, the system including a pressure oil circuit having a pump for supplying pressurized oil, and a transmission ratio control valve having a spool for controlling the pressurized oil so as to move the disc of the drive pulley to change the actual transmission ratio of the transmission, the improvement in the system comprising:
   first means for moving the spool of the transmission ratio control valve;
   second means responsive to disengagement of the clutch, when speed of the vehicle is below a predetermined speed, for producing a coasting signal;
   third means responsive to the coasting signal for producing a drive pulley speed set signal;
   fourth means responsive to the drive pulley speed set signal for producing a shifting signal representing a quantity of shifting the spool of the transmission ratio control valve in upshifting direction, and
   fifth means responsive to the shifting signal for shifting the spool of the transmission ratio control valve in the upshifting direction via said first means thereby decreasing the drive pulley speed.

2. The system according to claim 1 wherein said first means is a hydraulic circuit for applying control pressure to one end of the spool of the transmission ratio control valve so as to axially move the spool.

3. The system according to claim 2 further comprising
   an electromagnetic valve provided in the hydraulic circuit having a coil responsive to the shifting signal via said fifth means for controlling the control pressure applied to the spool of the transmission ratio control valve.

4. The system according to claim 1 wherein the shifting signal comprises a pulse train having a duty ratio determining the control pressure.

5. The system according to claim 1, wherein said drive pulley set signal represents idling speed of the engine at the clutch disengaged condition.

6. The system according to claim 5, wherein said fourth means is also responsive to the speed of the driven pulley, said shifting signal representing a calculated transmission ratio such that the actual transmission ratio changes to said calculated transmission ratio.

7. The system according to claim 6, wherein said fifth means is simultaneously responsive to a signal representative of the actual transmission ratio and to said shifting signal.

8. The system according to claim 1, wherein said second means if further responsive to actual engine speed and actual speed of the drive pulley.

9. In a system for controlling an infinitely variable transmission for transmitting the power of an internal combustion engine through a clutch for driving a motor vehicle, the transmission comprising a drive pulley having a hydraulically shiftable disc and a hydraulic cylinder for shifting the disc, a driven pulley having a hydraulically shiftable disc and a hydraulic cylinder for operating the disc of the driven pulley, and a belt engaged with both pulleys, the system including a pressure oil circuit having a pump for supplying pressurized oil, and a transmission ratio control valve having a spool for controlling the pressurized oil so as to move the disc of the drive pulley to change the actual transmission ratio of the transmission, the improvement in the system comprising:
   first means for moving the spool of the transmission ratio control valve;
   second means responsive to a disengaged condition of the clutch, when speed of the vehicle is below a predetermined speed, for producing a coasting signal;
   third means responsive to the coasting signal for producing a drive pulley speed set signal representing idling speed of the engine at the clutch disengaged condition;
   fourth means responsive to the drive pulley speed set signal for producing for said first means a control signal representing a quantity of shifting the spool of the transmission ratio control valve so that said transmission ratio changes such that the drive pulley speed equals said idling speed of the engine at the clutch disengaged condition when the drive pulley is driven via said driven pulley and said belt during coasting of the vehicle.

10. The system according to claim 9 wherein said fourth means produces said control signal such that the actual transmission ratio rapidly initially is reduced so that actual speed of said drive pulley equals said idling speed of the engine at the clutch disengaged condition and thereafter the actual transmission ratio is increased such that said drive pulley speed equals said idling speed of the engine at the clutch disengaged condition as the speed of the vehicle decreases when the drive pulley is driven via said driven pulley and said belt during coasting of the vehicle.

* * * * *